United States Patent
Park et al.

(10) Patent No.: US 8,284,940 B2
(45) Date of Patent: *Oct. 9, 2012

(54) SYSTEM FOR SUPPORTING OVER-THE-AIR SERVICE AND METHOD THEREOF

(75) Inventors: Young Chual Park, Yongin (KR); Tae Joon Yang, Seongnam (KR); Ki Jeong Lee, Seoul (KR)

(73) Assignee: KT Corporation, Gyeonggi-do (KR)

( * ) Notice: Subject to any disclaimer, the term of this patent is extended or adjusted under 35 U.S.C. 154(b) by 20 days.

This patent is subject to a terminal disclaimer.

(21) Appl. No.: 12/666,204

(22) PCT Filed: Jun. 18, 2008

(86) PCT No.: PCT/KR2008/003441

§ 371 (c)(1),
(2), (4) Date: Aug. 20, 2010

(87) PCT Pub. No.: WO2009/002042

PCT Pub. Date: Dec. 31, 2008

(65) Prior Publication Data

US 2010/0322425 A1 Dec. 23, 2010

(30) Foreign Application Priority Data

Jun. 22, 2007 (KR) .................. 10-2007-0061687

(51) Int. Cl.
H04K 1/00 (2006.01)
(52) U.S. Cl. ............................ 380/270; 380/44; 713/160
(58) Field of Classification Search .................. 380/270, 380/44; 713/160
See application file for complete search history.

(56) References Cited

U.S. PATENT DOCUMENTS

| 5,745,571 | A | 4/1998 | Zuk |
| 6,023,689 | A * | 2/2000 | Herlin et al. .................... 705/67 |
| 6,385,723 | B1 | 5/2002 | Richards |
| 7,352,868 | B2 * | 4/2008 | Hawkes et al. ............... 380/281 |
| 7,558,234 | B2 * | 7/2009 | Dommaraju et al. ......... 370/328 |
| 7,720,494 | B2 * | 5/2010 | Ahn .............................. 455/466 |
| 2004/0030906 | A1 | 2/2004 | Marmigere et al. |
| 2004/0064688 | A1 | 4/2004 | Jacobs |

(Continued)

FOREIGN PATENT DOCUMENTS

EP 1195965 A2 4/2002

(Continued)

OTHER PUBLICATIONS

International Search Report for PCT/KR2008/003441 filed Jun. 18, 2008.

*Primary Examiner* — Carl Colin
*Assistant Examiner* — Mohammad Siddiqi
(74) *Attorney, Agent, or Firm* — IP Legal Services, LLC

(57) ABSTRACT

Disclosed herein is a system and method for providing Over-The-Air (OTA) service. The system according to the present invention includes a mobile terminal for, when a message is received from an OTA server, dividing OTA data, included in the message, into data segments of a predetermined size depending on a size of the message, and a smart card for receiving each of the data segments, decrypting the data segment using a preset OTA key, and storing the decrypted OTA data in a preset area.

10 Claims, 3 Drawing Sheets

U.S. PATENT DOCUMENTS

| | | |
|---|---|---|
| 2004/0131185 A1 | 7/2004 | Kakumer |
| 2007/0288752 A1* | 12/2007 | Chan .......................... 713/171 |
| 2008/0292101 A1* | 11/2008 | Macchi ........................ 380/270 |
| 2009/0067367 A1* | 3/2009 | Buracchini et al. ........... 370/328 |

FOREIGN PATENT DOCUMENTS

| | | |
|---|---|---|
| KR | 1019990038700 A | 6/1999 |
| KR | 1020030018991 A | 3/2003 |
| KR | 1020040036402 A | 4/2004 |

* cited by examiner

SYSTEM FOR SUPPORTING OVER-THE-AIR SERVICE AND METHOD THEREOF

TECHNICAL FIELD

The present invention relates to a system and method for providing Over-The-Air (OTA) service.

BACKGROUND ART

In general, OTA service denotes a general type of wireless communication service which sends information as requested by the users of mobile terminals. That is, OTA service is a service in which an OTA server sends information to a mobile terminal when a user requests information from the OTA server.

A mobile terminal installs terminal information related to mobile terminal or various types of applications (hereinafter 'applets') in a smart cards and then uses these. Since smart cards can store and process a large amount of information and provide excellent security, the necessity for smart cards is gradually increasing. For example, smart cards can be used in the financial, communication, medical, security and broadcasting fields.

Here, smart cards may be generally classified into the following three types depending on their functions and internal structures. That is, smart cards may include 1) memory-type smart cards in which microprocessors are not embedded, 2) smart cards in which microprocessors are embedded, and 3) interactive smart cards in which applications are installed and which are capable of the bi-directional transmission of information.

Such smart cards are used separately for their respective purposes, and are provided with data corresponding to terminal information or an applet via a Short Message Service (SMS) message. Accordingly, there is a data transmission capacity problem, for example, only data of a maximum size of 180 bytes can be sent, and thus currently it is possible to send only a small amount of data.

As a countermeasure against this problem, a method of transmitting OTA data through a Virtual Machine (VM) and a browser has been proposed. However, this method also has a problem in that OTA data can be received only when access to the wireless Internet has been made.

As a result, research into a system and method for providing OTA service that enables various types of OTA data to be installed or stored in a single smart card and processed efficiently must be continuously conducted.

DISCLOSURE

Accordingly, the present invention has been made keeping in mind the above problems occurring in the prior art, and an object of the present invention is to provide a system and method for providing OTA service which enables OTA data to be encrypted and decrypted using preset OTA keys depending on the type of OTA data, thereby enabling various types of OTA data to be installed or stored in a single smart card.

Another object of the present invention is to provide a system and method for providing OTA service which divides and provides OTA data depending on the processing capacity of a smart card, thereby enabling the efficient processing of a large amount of OTA data.

In order to achieve the above objects, according to an aspect of the present invention, there is provided a system, including a mobile terminal for, when a message is received from an OTA server, dividing OTA data, included in the message, into data segments of a predetermined size depending on a size of the message; and a smart card for receiving each of the data segments, decrypting the data segment using a preset OTA key, and storing the decrypted OTA data in a preset area.

According to another aspect of the present invention, there is provided a smart card, including a first processing unit for receiving OTA data from a mobile terminal, decrypting the received OTA data using a first type of OTA key, and determining whether to process a first type of extracted OTA data; a CPU for receiving the first type of OTA data depending on results of the determination; and a second processing unit for receiving the first type of OTA data from the CPU, decrypting the first type of OTA data using a second type of OTA key, and processing a second type of extracted OTA data.

According to still another aspect of the present invention, there is provided a method of providing OTA service, including, dividing OTA data, included in the message, into data segments of a predetermined size depending on a size of the message when a message is received from an OTA server; and sending each of the data segments to a smart card.

According to still another aspect of the present invention, there is provided a method of providing OTA service, including, decrypting the received OTA data using a first type of OTA key when OTA data is received from a mobile terminal and determining whether to process a first type of extracted OTA data through a first processing unit; receiving the first type of OTA data from the first processing unit depending on results of the determination; and decrypting the first type of OTA data using a second type of OTA key and processing a second type of extracted OTA data through a second processing unit.

DESCRIPTION OF REFERENCE NUMERALS OF PRINCIPAL ELEMENTS IN THE DRAWINGS

Figure 1:
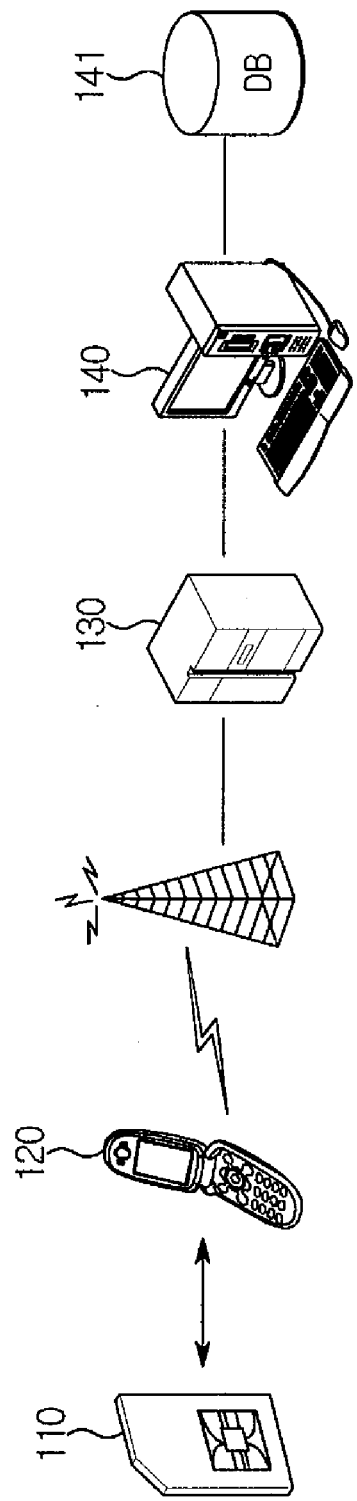
FIG. 1 is a diagram showing an example of the schematic construction of a system according to an embodiment of the present invention.

110: smart card
120: mobile terminal
130: message center
140: OTA server
141: database
310: first storage unit
320: second storage unit
330: first processing unit
340: second processing unit
350: ROM (Read Only Memory)
360: CPU (Central Processing Unit)
370: RAM (Random Access Memory)
380: interface

[Mode for Invention]

A system and method of providing OTA service according to an embodiment of the present invention will be described in detail below with reference to FIGS. 1 to 4.

The present invention proposes a method of constructing a USIM/SIM Application Toolkit (USAT) framework and a Global Platform (GP) framework in a smart card and installing or storing various types of OTA data in the smart card via the frameworks. That is, the present invention enables all services, including financial services such as mobile banking, stock trading and a credit card service, daily life infrastructure services such as a traffic card service and an ID card service, and other services such as a broadcasting service and a communication service, to be incorporated into a single smart card.

For this purpose, the present invention proposes the setup of OTA keys in the respective frameworks to grant processing rights for various types of OTA data.

Accordingly, the present invention allows for the provision of OTA data, for example, a mobile application which requires a large amount of data, via Multimedia Message Service (MMS) messages. Here, a mobile application may refer to a program that is downloaded to a mobile terminal, and is independently executed and used.

FIG. 1 is a diagram showing an example of the schematic construction of a system according to an embodiment of the present invention.

As shown in FIG. 1, the system according to the present invention may include a smart card 110, a mobile terminal 120, a message center 130, an OTA server 140, and a database 141.

OTA data, such as various types of terminal information related to mobile terminal and mobile applications (hereinafter 'applets') corresponding to various types of additional services, for use in the financial, communication, medical, security and broadcasting fields, may be installed in the smart card 110. The mobile terminal 120, which operates in conjunction with the smart card 110, may use the OTA data installed in the smart card 110.

In this case, the smart card 110 may refer to any one of a Subscriber Identification Module (SIM) card, a Universal Subscriber Identification Module (USIM) card, a User Identification Module (UIM) card and a Removable User Identification Module (RUIM) card, which may be installed in or detachably attached to the mobile terminal 120.

The OTA server 140 may create a message, including OTA data. The OTA server 140 may provide the created message to the mobile terminal 120 through the message center 130.

The database 141 may assemble and manage OTA data to be installed or stored in the smart card 110.

The message center 130 may send a message including OTA data. For example, the message center 130 may be any one of a Short Message Service Center (SMSC), a Long Message Service Center (LMSC) and a Multimedia Message Service Center (MMSC).

The present invention proposes a method of dividing OTA data depending on the processing capacity of a smart card and then sending divided OTA data. Using this method, the present invention allows for the efficient processing of a large amount of OTA data.

Figure 2:
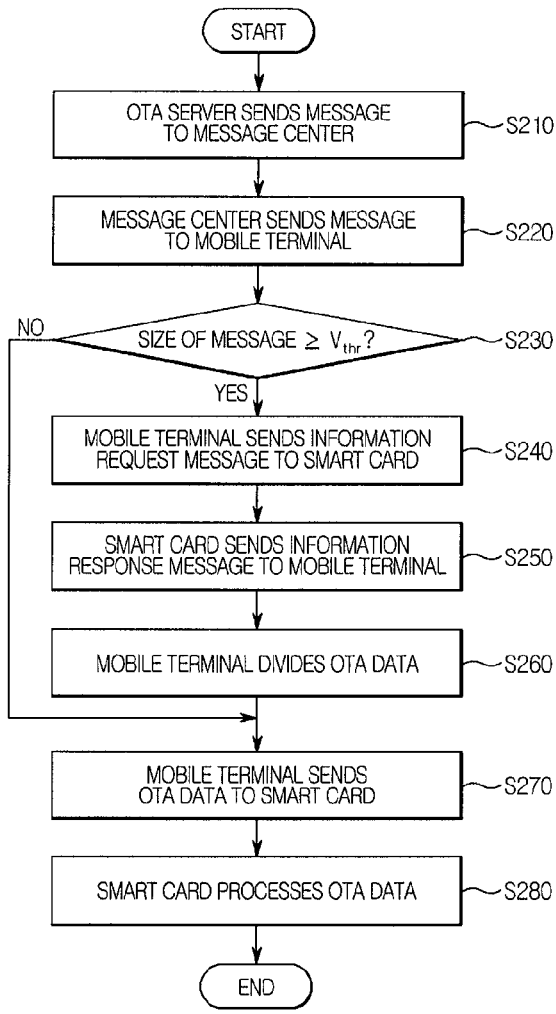
FIG. 2 is a first flowchart showing a method of providing OTA service according to an embodiment of the present invention.

FIG. 2 is a first flowchart showing a method of providing OTA service according to an embodiment of the present invention.

As shown in FIG. 2, when a user requires OTA data, the mobile terminal may request the OTA data from the OTA server. The OTA server may check the type of requested OTA data, that is, whether the requested OTA data is a first type of OTA data corresponding to terminal information related to mobile terminal or a second type of OTA data corresponding to service information related to additional service.

The OTA server may search the database for the OTA data. The OTA server may encrypt found OTA data using a preset OTA key. The OTA server may create a message including the encrypted OTA data.

In this case, the OTA server may encrypt the OTA data using a preset OTA key depending on the type of OTA data. Such OTA keys for encrypting OTA data may include a first type of OTA key that is used for terminal information such as an authentication value for the authentication of a mobile terminal, a phone book, and a language for the setting of the mobile terminal, and a second type of OTA key that is used for service information such as an applet for the use of an additional service, for example, banking, stock trading, a certificate service or a credit card service, and personal information related to applet such as a bank account number, an encryption key value and a Personal Identification Number (PIN).

In greater detail, if the requested OTA data is a first type of OTA data, the OTA server may create a first type of encrypted OTA data by encrypting the first type of OTA data using a first type of OTA key. Accordingly, the OTA server may create a message including the first type of encrypted OTA data.

If the requested OTA data is a second type of OTA data, the OTA server may create a second type of encrypted OTA data by encrypting the second type of OTA data using a second type of OTA key. Accordingly, the OTA server may create a message including the second type of encrypted OTA data.

In this case, when creating the message including the second type of encrypted OTA data, the OTA server may opt not to include the second type of primarily encrypted OTA data in a message, but may secondarily encrypt the second type of primarily encrypted OTA data using the first type of OTA key and then create a message including the second type of secondarily encrypted OTA data.

Thereafter, the OTA server may send the created message to the message center at step S210. The message center may send the message to the mobile terminal at step S220.

In this case, the message may be any one of a Short Message Service (SMS) message, a Long Message Service (LMS) message and a Multimedia Message Service (MMS) message.

The mobile terminal may receive the message. The mobile terminal may determine whether the size of the received message is equal to or larger than a preset threshold value V at step S230.

If the size of the message is smaller than the preset threshold value $V_{thr}$, the mobile terminal may extract encrypted OTA data from the received message. Accordingly, the mobile terminal may send the extracted OTA data to the smart card without change.

In contrast, if the size of the message is equal to or larger than the preset threshold value $V_{thr}$, the mobile terminal may create an information request message, requesting information corresponding to the processing capacity of the smart card, such as CPU information.

Thereafter, the mobile terminal may send the created information request message to the smart card at step S240.

The smart card may create an information response message in response to the information request message. The smart card may send the created information response message to the mobile terminal at step S250.

The mobile terminal may receive the information response message. The mobile terminal may divide the encrypted OTA data into data segments of a predetermined size based on the information response message at step S260.

Accordingly, the mobile terminal may send each of the data segments to the smart card at step S270.

As a result, the smart card may receive and process the data segment at step S280. As described above, in the present invention, various types of OTA data may be installed or stored in a single smart card in such a way as to encrypt and decrypt OTA data using preset OTA keys depending on the type of data.

Figure 3:
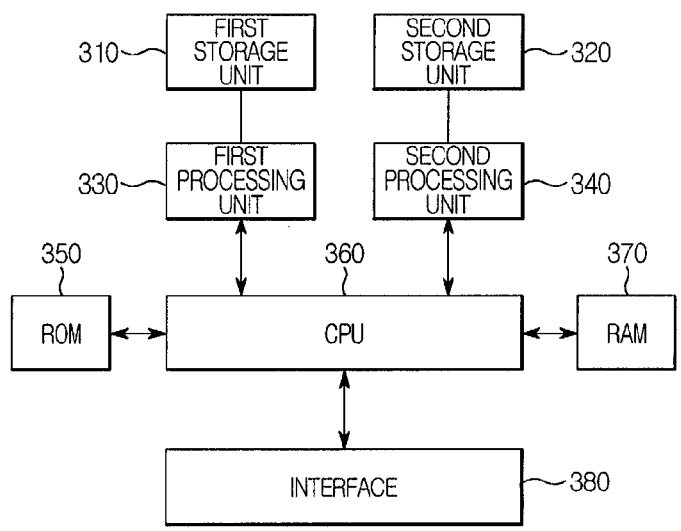
FIG. 3 is a diagram showing an example of the detailed construction of the smart card shown in FIG. 1.

FIG. 3 is a diagram showing an example of the detailed construction of the smart card shown in FIG. 1.

As shown in FIG. 3, the smart card according to the present invention may include a first storage unit 310, a second storage unit 320, a first processing unit 330, a second processing unit 340, Read Only Memory (ROM) 350, a Central Processing Unit (CPU) 360, Random Access Memory (RAM) 370, and an interface 380.

The interface 380 may receive encrypted OTA data from the mobile terminal.

The CPU 360 may provide the received OTA data to the first processing unit 330, and may receive OTA data from the first processing unit 330 or the second processing unit 340 and then provide the OTA data to the mobile terminal through the interface 380.

The ROM 350 may store an operating system and programs related thereto. The RAM 370 may be used as working space for the CPU 360.

The first processing unit 330 may receive encrypted OTA data from the mobile terminal. The first processing unit 330 may decrypt the OTA data using a first type of OTA key and extract a first type of OTA data.

Accordingly, the first processing unit 330 may process a first type of extracted OTA data, that is, it may install or store a first type of extracted OTA data in the first storage unit 310.

In contrast, if the OTA data extracted using the first type of OTA key is encrypted OTA data that cannot be processed by the first processing unit 330, the first processing unit 330 may provide the extracted OTA data to the second processing unit 340.

The second processing unit 340 may receive the encrypted OTA data from the first processing unit 330. The second processing unit 340 may decrypt the OTA data using a second type of OTA key and extract a second type of OTA data.

Accordingly, the second processing unit 340 may process a second type of extracted OTA data, that is, it may install or store the second type of extracted OTA data in the second storage unit 320.

In this case, a USIM/SIM Application Toolkit (USAT) framework may be applied to the first processing unit. A Global Platform (GP) framework may be applied to the second processing unit.

Here, the first storage unit 310 and the second storage unit 320 may be formed of respective separate areas in a single piece of Electrically Erasable and Programmable Read Only Memory (EEPROM) capable of storing OTA data, or may be formed of respective pieces of EEPROM.

As described above, the present invention allows for the division and provision of OTA data depending on the processing capacity of a smart card, thereby enabling the efficient processing of a large amount of data.

Figure 4:
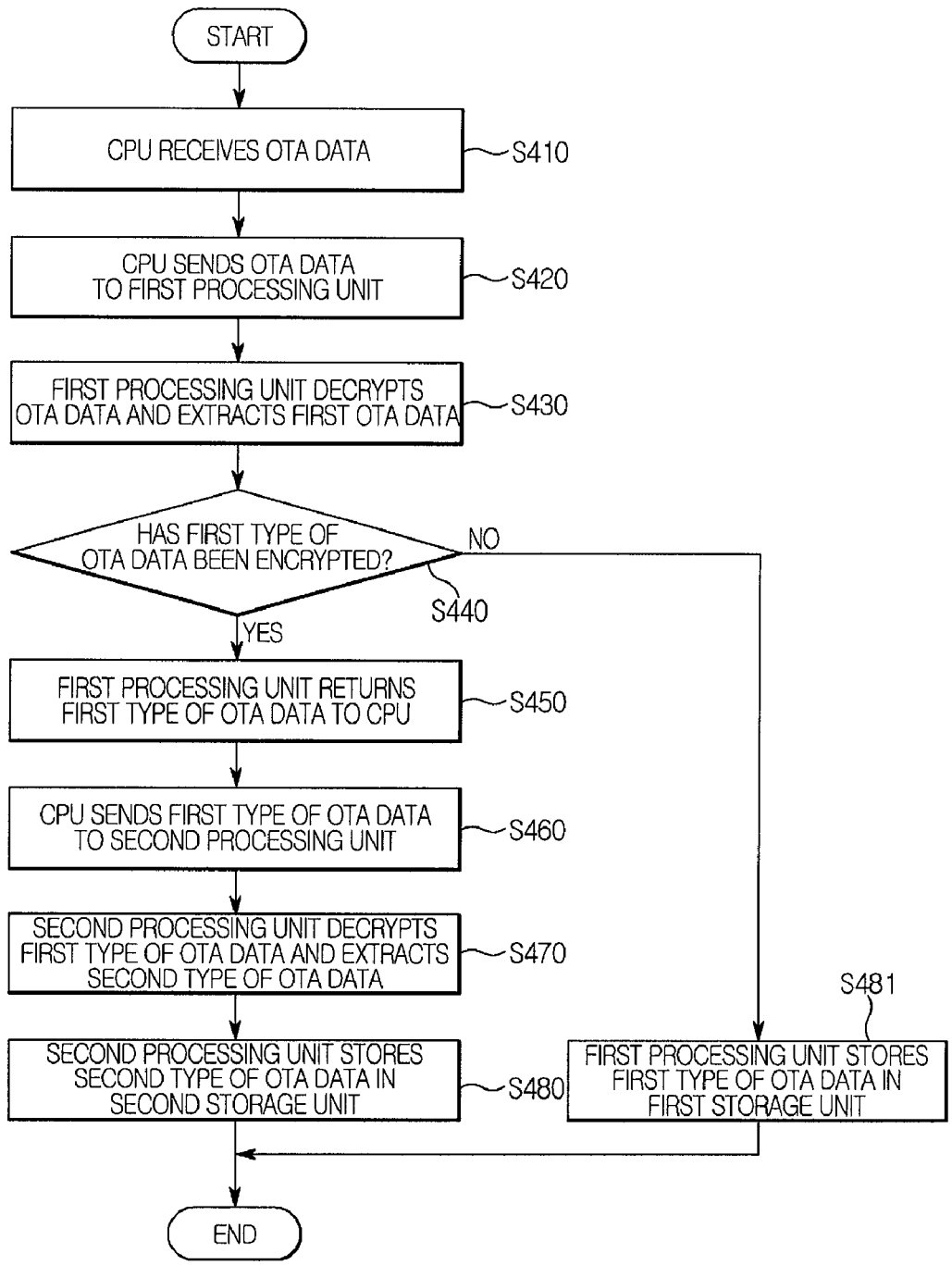
FIG. 4 is a second flowchart showing a method of providing OTA service according to an embodiment of the present invention.

FIG. 4 is a second flowchart showing a method of providing OTA service according to an embodiment of the present invention.

As shown in FIG. 4, the CPU may receive encrypted OTA data from the mobile terminal at step S410. The CPU may send the received OTA data to the first processing unit first at step S420.

Accordingly, the first processing unit may receive the encrypted OTA data from the CPU. The first processing unit may decrypt the encrypted OTA data using a first type of preset OTA key and extract a first type of OTA data at step S430.

The first processing unit may check whether the first type of extracted OTA data has been encrypted at step S440. That is, since the first processing unit determines extracted OTA data to be a first type of OTA data if the extracted OTA data has not been encrypted, the first processing unit may install or store the extracted OTA data in the first storage unit at step S481.

In contrast, if the first type of extracted OTA data has been encrypted, the first processing unit may return the first type of extracted OTA data to the CPU at step S450. Accordingly, the CPU may send the first type of returned OTA data to the second processing unit at step S460.

The second processing unit may receive the first type of OTA data from the first processing unit. The second processing unit may decrypt the first type of OTA data using a second type of preset OTA key and extract a second type of OTA data at step S470.

As a result, the second processing unit may install or store the second type of extracted OTA data in the second storage unit at step S480.

The reason for this is to enable the first processing unit to access the OTA data using the first type of OTA key and enable the second processing unit to access the OTA data using the second type of OTA key.

As described above, in the present invention, OTA data is encrypted and decrypted using preset OTA keys, that is, the first type of OTA key and the second type of OTA key, and thus processing rights for various types of OTA data can be distinctively granted through the above-described procedure.

The system and method for providing OTA service according to the present invention may be varied and modified within the scope of the technical spirit of the present invention, and is not limited to the above-described embodiments. Furthermore, the above embodiments and drawings are intended to describe the content of the present invention in detail, but are not intended to limit the range of the technical spirit of the present invention. Since it will be apparent to those skilled in that art that various substitutions, variations and modifications of the present invention are possible within the scope of the technical spirit of the present invention, the present invention is not limited to the above-described embodiments and the attached drawings. The range of the rights of the present invention should be appreciated on the basis of the range of equivalents to the present invention, as well as the following claims.

The invention claimed is:
1. A system, comprising:
a mobile terminal configured to, when a message is received from an Over-The-Air (OTA) server, divide OTA data, included in the message, into data segments of a predetermined size depending on a size of the message; and
a smart card configured to (i) receive each of the data segments, (ii) decrypt the data segment using a preset OTA key, and (iii) store the decrypted OTA data in a preset area, wherein the smart card comprises:
 a first processing unit configured to (i) receive OTA data from a mobile terminal, (ii) decrypt the received OTA data using a first type of OTA key, and (iii) determine whether to process a first type of extracted OTA data;
 a Central Processing Unit (CPU) configured to receive the first type of OTA data depending on results of the determination; and a second processing unit configured to (i) receive the first type of OTA data from the CPU, (ii) decrypt the first type of OTA data using a second type of OTA key, and (iii) process a second type of extracted OTA data;

wherein, if a size of the message is equal to or larger than a preset threshold value, the mobile terminal is configured to:

(i) create an information request message, (ii) request information corresponding to data processing capacity of the smart card, and (iii) send the information request message to the smart card, (iv) receive an information response message from the smart card as a response to the information request message, and (v) divide the OTA data into the data segments of a predetermined size based on information included in the received information response message.

2. The system according to claim 1, wherein the smart card is further configured to:

store the first type of extracted OTA data in a first storage unit; and store the second type of extracted OTA data in a second storage unit.

3. The system according to claim 1, wherein the smart card is any one of a Subscriber Identification Module (SIM) card, a Universal Subscriber Identification Module (USIM) card, a User Identification Module (UIM) card and a Removable User Identification Module (RUIM) card, which is capable of being installed in or detachably attached to the mobile terminal.

4. The system according to claim 1, wherein the message is any one of a Short Message Service (SMS) message, a Long Message Service (LMS) message and a Multimedia Message Service (MMS) message.

5. A smart card, comprising:

a first processing unit configured to (i) receive OTA data from a mobile terminal, (ii) decrypt the received OTA data using a first type of OTA key, and (iii) determine whether to process a first type of extracted OTA data;

a Central Processing Unit (CPU) configured to receive the first type of OTA data depending on results of the determination; and a second processing unit configured to (i) receive the first type of OTA data from the CPU, (ii) decrypt the first type of OTA data using a second type of OTA key, and (iii) process a second type of extracted OTA data, wherein, if a size of the OTA data is equal to or larger than a preset threshold value, the mobile terminal is configured to:

(i) create an information request message, (ii) request information corresponding to data processing capacity of the smart card, and (iii) send the information request message to the smart card, (iv) receive an information response message from the smart card as a response to the information request message, and (v) divide the OTA data into the data segments of a predetermined size based on information included in the received information response message.

6. The smart card according to claim 5, wherein the first processing unit is further configured to:

if the first type of OTA data, extracted by decrypting the OTA data using the first type of OTA key, has not been encrypted, install the first type of OTA data in a first storage unit; and if the first type of OTA data, extracted using the first type of OTA key, has been encrypted, return the first type of OTA data to the CPU.

7. The smart card according to claim 5, wherein a USIM/SIM Application Toolkit (USAT) framework is applied to the first processing unit, and a Global Platform (GP) framework is applied to the second processing unit.

8. The smart card according to claim 5, further comprising:

an interface configured to transfer the OTA data between the mobile terminal and the smart card;

wherein the CPU is further configured to (i) provide the received OTA data to the first processing unit, (ii) received the OTA data from at least one of the first processing unit and the second processing unit, and (iii) provide the OTA data to the mobile terminal through the interface.

9. A method of providing OTA service, comprising:

dividing OTA data, included in the message, into data segments of a predetermined size depending on a size of the message when a message is received from an OTA server wherein, if the size of the message is equal to or larger than a preset threshold value:

by the mobile terminal: (i) create an information request message, (ii) requesting information corresponding to data processing capacity of the smart card, (iii) sending the information request message to the smart card, (iv) receiving an information response message from the smart card as a response to the information request message, and (v) dividing the OTA data into the data segments of a predetermined size based on information included in the received information response message;

sending each of the data segments to a smart card, wherein the smart card performs the steps of:

determining whether to process the received data segments by decrypting the received data segments into a first type of OTA data by a first processing unit of the smart card using a first type of OTA key;

receiving, by at least one of a central processing unit (CPU) and a second processing unit of the smart card, the first type of OTA data from the first processing unit depending on results of the determination;

generating, by the second processing unit, a second type of extracted OTA data by decrypting the first type of OTA data using a second type of OTA key; and processing the second type of extracted OTA data through the second processing unit.

10. A method of providing OTA service, comprising:

determining whether to process received OTA data by decrypting the received OTA data into a first type of OTA data by a first processing unit of the smart card using a first type of OTA key;

receiving, by at least one of a central processing unit (CPU) and a second processing unit of the smart card, the first type of OTA data from the first processing unit depending on results of the determination;

generating, by the second processing unit, a second type of extracted OTA data by decrypting the first type of OTA data using a second type of OTA key; and processing the second type of extracted OTA data through the second processing unit, wherein the division of the OTA data into the data segments of a predetermined size comprises:

determining whether a size of the received message is equal to or larger than a preset threshold value;

determining whether to divide the OTA data included in the message if the size of the message is equal to or larger than the threshold value; and dividing the OTA data, included in the message, into data segments of a predetermined size depending to results of the determination; and wherein the determination of whether to divide the OTA data comprises:

sending an information request message, requesting information corresponding to data processing capability of the smart card, to the smart card depending on whether to divide the OTA data if the size of the message is equal to or larger than the threshold value;

receiving an information response message in response to the information request message from the smart card; and determining whether to divide the OTA data based on information included in the received information response message when the mobile terminal receives the information response message.

* * * * *